United States Patent
Knoller (10) Patent No.: US 10,576,979 B2
(45) Date of Patent: Mar. 3, 2020

(54) LONGITUDINAL DRIVER ASSISTANCE SYSTEM IN A MOTOR VEHICLE

(71) Applicant: Bayerische Motoren Werke Aktiengesellschaft, Munich (DE)

(72) Inventor: Stefan Knoller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 94 days.

(21) Appl. No.: 15/869,574

(22) Filed: Jan. 12, 2018

(65) Prior Publication Data

US 2018/0134294 A1    May 17, 2018

Related U.S. Application Data

(63) Continuation of application No. PCT/EP2016/064035, filed on Jun. 17, 2016.

(30) Foreign Application Priority Data

Jul. 14, 2015    (DE) .................. 10 2015 213 193

(51) Int. Cl.
*B60W 30/14*    (2006.01)
*B60W 50/14*    (2012.01)
(Continued)

(52) U.S. Cl.
CPC ........ *B60W 30/143* (2013.01); *B60W 30/146* (2013.01); *B60W 50/0097* (2013.01);
(Continued)

(58) Field of Classification Search
USPC ......................................................... 701/93
See application file for complete search history.

(56) References Cited

U.S. PATENT DOCUMENTS 8,751,133 B2 *  6/2014  Poulin ................ B60W 30/146
                                                    700/304
8,849,494 B1    9/2014  Herbach et al.
(Continued)

FOREIGN PATENT DOCUMENTS

CN         104507780 A    4/2015
DE    10 2004 042 382 A1    3/2006
(Continued)

OTHER PUBLICATIONS

International Search Report (PCT/ISA/210) issued in PCT Application No. PCT/EP2016/064035 dated Nov. 9, 2016 with English translation (seven pages).
(Continued)

*Primary Examiner* — Tyler D Paige
(74) *Attorney, Agent, or Firm* — Crowell & Moring LLP (57) ABSTRACT

A longitudinal driver assistance system in a motor vehicle includes a detection system for recognizing upcoming relevant events which require a change in the maximum permitted top speed, and a functional unit which, upon recognizing a relevant event, determines a location-dependent time taking into consideration the location of the relevant event. Upon achieving this, the functional unit prompts the transmission of request information for permitting an automatic adaptation of the current maximum permitted top speed to a new maximum permitted top speed. With the determining of the location-dependent time, the functional unit is also configured to take into consideration a predetermined minimum duration for the transmission of the request information.

18 Claims, 3 Drawing Sheets

(51) Int. Cl.
  *B60W 50/00* (2006.01)
  *B60W 50/08* (2020.01)
(52) U.S. Cl.
  CPC .......... *B60W 50/085* (2013.01); *B60W 50/14* (2013.01); *B60K 2310/244* (2013.01); *B60W 2420/403* (2013.01); *B60W 2540/04* (2013.01); *B60W 2550/22* (2013.01); *B60W 2550/402* (2013.01); *B60W 2720/10* (2013.01)

(56) References Cited

U.S. PATENT DOCUMENTS

| | | | |
|---|---|---|---|
| 8,996,224 B1 | 3/2015 | Herbach et al. | |
| 9,008,890 B1 | 4/2015 | Herbach et al. | |
| 9,014,904 B2 | 4/2015 | Higgins-Luthman | |
| 9,507,346 B1 | 11/2016 | Levinson et al. | |
| 9,937,923 B2* | 4/2018 | Custer | G08G 1/015 |
| 9,940,528 B2 | 4/2018 | Higgins-Luthman | |
| 9,956,877 B2* | 5/2018 | Nakade | B60K 35/00 |
| 9,977,430 B2 | 5/2018 | Shalev-Shwartz et al. | |
| 2002/0022920 A1 | 2/2002 | Straub | |
| 2004/0193374 A1 | 9/2004 | Hac et al. | |
| 2006/0100769 A1 | 5/2006 | Arai et al. | |
| 2006/0184297 A1 | 8/2006 | Higgins-Luthman | |
| 2007/0050130 A1* | 3/2007 | Grimm | G08G 1/0967 16 701/420 |
| 2008/0255746 A1* | 10/2008 | Hellmann | B60K 26/021 701/96 |
| 2010/0217494 A1* | 8/2010 | Heft | B60T 7/22 701/70 |
| 2011/0112740 A1* | 5/2011 | Hashimoto | F02D 17/02 701/70 |
| 2012/0215416 A1* | 8/2012 | Poulin | B60W 30/146 701/93 |
| 2012/0253628 A1 | 10/2012 | Maruyama | |
| 2012/0316746 A1 | 12/2012 | Park | |
| 2013/0219294 A1 | 8/2013 | Goldman-Shenhar et al. | |
| 2014/0200788 A1* | 7/2014 | Eriksson | B60K 31/0058 701/93 |
| 2014/0309864 A1 | 10/2014 | Ricci | |
| 2014/0330456 A1 | 11/2014 | Lopez Morales et al. | |
| 2015/0105993 A1 | 4/2015 | Um et al. | |
| 2015/0112526 A1 | 4/2015 | Martin et al. | |
| 2015/0149059 A1 | 5/2015 | Choi | |
| 2015/0192660 A1 | 7/2015 | Dickow et al. | |
| 2015/0339928 A1 | 11/2015 | Ramanujam | |
| 2016/0082960 A1 | 3/2016 | Slaton et al. | |
| 2016/0125735 A1 | 5/2016 | Tuukkanen | |
| 2016/0214608 A1 | 7/2016 | Packwood-Ace | |
| 2016/0264021 A1 | 9/2016 | Gillett | |
| 2017/0076201 A1 | 3/2017 | van Hasselt et al. | |
| 2017/0088038 A1 | 3/2017 | Geller | |
| 2018/0032082 A1 | 2/2018 | Shalev-Shwartz et al. | |
| 2018/0345948 A1* | 12/2018 | Ulrich | B60W 50/085 |

FOREIGN PATENT DOCUMENTS

| | | |
|---|---|---|
| DE | 10 2007 005 245 A1 | 11/2007 |
| DE | 10 2008 018 421 A1 | 9/2009 |
| DE | 10 2010 054 241 A1 | 6/2012 |
| DE | 10 2012 102 564 A1 | 10/2012 |
| DE | 10 2012 010 865 A1 | 12/2012 |
| DE | 10 2012 211 967 A1 | 1/2014 |
| DE | 10 2012 213 299 A1 | 1/2014 |
| DE | 10 2013 205 609 A1 | 10/2014 |
| DE | 10 2013 209 064 A1 | 11/2014 |
| DE | 10 2014 017 522 A1 | 6/2015 |
| DE | 10 2014 215 673 A1 | 2/2016 |
| EP | 2 020 331 A1 | 2/2009 |
| JP | 2010-198578 A | 9/2010 |
| JP | 2012-206594 A | 10/2012 |

OTHER PUBLICATIONS

German-language Written Opinion (PCT/ISA/237) issued in PCT Application No. PCT/EP2016/064035 dated Nov. 9, 2016 (six pages).

German-language Office Action issued in counterpart German Application No. 10 2015 213 183.1 dated Feb. 23, 2016 (seven pages).

Chinese Office Action Issued in Chinese counterpart application No. 201680037480.6 dated Sep. 5, 2019, with English translation (Twelve (12) pages).

* cited by examiner

FIG. 3

LONGITUDINAL DRIVER ASSISTANCE SYSTEM IN A MOTOR VEHICLE

CROSS REFERENCE TO RELATED APPLICATIONS

This application is a continuation of PCT International Application No. PCT/EP2016/064035, filed Jun. 17, 2016, which claims priority under 35 U.S.C. § 119 from German Patent Application No. 10 2015 213 183.1, filed Jul. 14, 2015, the entire disclosures of which are herein expressly incorporated by reference.

BACKGROUND AND SUMMARY OF THE INVENTION

The invention relates to a longitudinal driver assistance system in a motor vehicle.

Basically, a large number of longitudinal driver assistance systems which are configured as cruise control systems and which adjust the speed of the motor vehicle to a predefined target or maximum permissible top speed are already known. In addition to these longitudinal control systems, nowadays it is also possible to acquire longitudinal control systems which have an added distance control, referred to as adaptive longitudinal control systems or cruise control systems, from a number of manufacturers. Such systems which are offered, for example, under the designation "active cruise control" by the Applicant of the present patent application permit the motor vehicle to be driven automatically at a desired or a correspondingly low speed while maintaining a desired distance from a vehicle traveling ahead. If a distance sensor system which is mounted on the motor vehicle and which can operate, in particular, on a radar basis, detects a target object or (motor) vehicle traveling ahead in the lane of the vehicle in question, the speed of the vehicle in question is adapted to the speed of the motor vehicle traveling ahead or of the target object, for example by bringing about a suitable braking torque, in such a way that a distance control system which is contained in the "active cruise control" or in the corresponding longitudinal control system automatically sets and maintains a situation-appropriate distance from the motor vehicle or target object traveling ahead.

Furthermore, longitudinal driver assistance systems which are configured as so-called speed-limiting systems and which prevent the maximum permissible speed set by the driver from being exceeded are known.

DE 10 2012 211 967 A1 describes a combination of a speed-limiting system and a cruise control system, wherein the maximum permissible top speed of the speed-limiting system can be adopted as the (new) desired or target speed for the cruise control instead of the set speed which is set.

Finally, in relatively new vehicles there are also driver assistance systems which can predictively detect a speed limit either from map data of a navigation system and/or by means of image processing, and indicate said speed limit to the driver permanently from the point when the speed limit is reached, with the result that the driver can automatically adapt his speed to the speed limit as required (e.g. BMW Speed Limit Info).

DE 10 2008 018 421 A1 discloses a driver assistance system for transmitting and receiving speed data and/or traffic density data for controlling a cruise control system, which driver assistance system determines a maximum permissible top speed on the basis of the received data and communicates said maximum permissible top speed to the driver by outputting a corresponding message. The driver can adopt this specification of the permissible speed by means of a simple actuation process for his cruise control system.

DE 102014215673 A1, which is not yet published, also discloses a longitudinal driver assistance system which, when an upcoming event is detected which requires a reduction in speed, determines a deceleration strategy and, at a defined time before the event is reached, outputs a request message to the driver to approve the automatic implementation of the deceleration strategy. If the driver confirms the request message, automatic implementation of the deceleration strategy is brought about. The detection unit can determine or detect a relevant event here either on the basis of map data (for example of a navigation device) or on the basis of camera data.

The object of the invention is then to make available an improved longitudinal driver assistance system with an offer display, which can be followed by the driver, for the automatic adoption of a new set speed.

This object is achieved by a driver assistance system in accordance with embodiments with invention.

The longitudinal driver assistance system according to the invention for a motor vehicle comprises a detection system for detecting upcoming relevant events which require a change in the maximum permissible top speed, and a functional unit which, when a relevant upcoming event is detected, determines, taking into account the location of the relevant event (and, if appropriate, further necessary information such as e.g. a determined maximum permissible speed at the location of the relevant event, the differential speed between the vehicle and the determined new maximum permissible speed, detected free travel or follow-on travel, current or approved deceleration operating modes of the vehicle such as e.g. sailing mode, thrust mode, braking mode), a location-dependent time, at the reaching of which the functional unit causes a request message to be output to approve automatic adaptation of the current maximum permissible top speed to a new maximum permissible top speed. If an upcoming event is detected in good time, a deceleration strategy of the vehicle for reaching the determined new maximum permissible top speed (at least virtually) at the location of the relevant event is therefore ideally determined. As a rule, the location-dependent time to be determined at which the outputting of a request message to approve automatic adaptation of the current maximum permissible top speed to a new maximum permissible top speed is brought about is then obtained on the basis of the determined deceleration strategy.

If, when a request message is output, a permission confirmation which is triggered (manually), for example by actuation of an operator control element, is detected, when the maximum permissible top speed (at least during free travel) is adapted, actuation of the drive actuated system and/or brake actuated system is brought about, taking into account the new maximum permissible top speed, by outputting a corresponding target acceleration value. The result is that the vehicle speed is adjusted to the new maximum permissible top speed, at least during free travel and in the case of a relatively high, manually predefined maximum permissible target speed.

The upcoming events may be, for example, temporary or permanent speed limits which are specified either directly on a road sign or are to be derived therefrom on the basis of the general traffic rules (e.g. in Germany there is a speed limit of 50 km/h when traveling through a built-up area). Likewise, the event in question may also be an event which triggers a speed limit or at least an event which increases to a new top speed, such as is usually the case e.g. when leaving a built-up area.

The (new) maximum permissible top speed, which is decisive for the longitudinal driver assistance system, at the location of the upcoming event can be either the actual predefined new speed limit or a speed which deviates upwardly or downwardly from the predefined new speed limit by a predefined amount. The amount and the direction of the deviation can, for example, also be adjustable by the driver in a central vehicle menu. This new top speed can be transmitted to the functional unit directly or be determined only on the basis of the information present in the functional unit.

Alternatively or additionally, it is also possible for the driver to himself define in a location-based manner speed limits on a route which is known to him by means of a vehicle-internal or vehicle-external interface. These speed limits can correspondingly be taken into account as new top speeds when driving along the route with an active longitudinal guidance system. In this context, the driver can also still select in advance e.g. whether he basically wishes to take into account all the self-defined speed limits, or only speed limits selected in accordance with a rule (e.g. only on a specific route, for specific route classes, at a specific time, depending on weather conditions, etc.). A plurality of speed profiles can also be created for a specific route section, and said speed profiles are then active according to predefined rules (speed profile for good route conditions, speed profile for wet routes and/or speed profile for snow-covered routes).

Furthermore, the functional unit can be configured to bring about cessation of the outputting of the request message when permission confirmation is detected. If a (manually) triggered rejection of the request message is detected, the outputting of the request message is also ceased.

The invention is based on the following recognition: if the vehicle which is equipped with the longitudinal driver assistance system is moving, for example owing to current follow-on travel, at a low differential speed to the new maximum permissible top speed at the upcoming location, the calculated time period from which, for example, a deceleration would have to be brought about in order to be able to reach the new maximum permissible top speed at the relevant location may be very short or zero. If, owing to this calculated time period, the request message is therefore only output briefly before or even only after passing through the relevant location, the driver would not always be able to follow this.

In order to prevent such implausible behavior of the longitudinal driver assistance system, it is provided according to the invention that the functional unit is configured to take into account, during the determination of the location-dependent time, a predefined minimum offer duration for the outputting of the request message, in particular a predefined minimum offer duration up to the reaching of the relevant event. Ideally, the functional unit is configured here to determine such a location-dependent time that the request message can be displayed at least for the predefined minimum offer duration and/or in the event of lack of acceptance or rejection is displayed for the predefined minimum offer duration up to the reaching of the relevant event.

The predefined minimum offer duration can be here a permanently predefined period of time of e.g. 1-4 seconds, in particular of 2-3 seconds. Alternatively it is also conceivable to predefine (in a variable fashion), instead of a permanently defined period of time, the minimum offer duration as a function of predefined parameters such as e.g. the road class which is currently being traveled on and/or is upcoming, the speed which is currently being traveled at and/or the new maximum permissible top speed. The term minimum offer duration can be understood to be either a period of time, that is to say a minimum period of time up to the reaching of the relevant location, or a route duration, that is to say a minimum distance up to the location of the relevant event, or a combination of period of time and route duration.

In addition to the predefined minimum offer duration to be taken into account, in one advantageous development of the invention it is additionally possible to determine, on the basis of a determined or currently permitted deceleration strategy, a (maximum) possible offer duration up to the reaching of the relevant event, which offer duration is then also to be taken into account during the determination of the location-dependent time, in particular by means of a comparison of this possible offer duration, determined on the basis of the deceleration strategy, with the predefined minimum offer duration. As has already been mentioned above, the deceleration strategy can be determined in such a way, or such a deceleration strategy can be applied, that when the deceleration strategy is implemented, the determined maximum permissible top speed as a rule can be or is reached at the location of the relevant event. Since the deceleration strategy firstly has to be determined before the precise time of the approval (and therefore of the implementation) of the deceleration strategy is known, the deceleration strategy must be adapted continuously to the currently applicable situation, even after the starting of the implementation of the deceleration strategy, wherein the subsequent adaptation starting from the time of the outputting of the request message no longer has any influence on the outputting of the message.

If a comparison of a possible offer duration, determined on the basis of a determined deceleration strategy, up to the reaching of the relevant event with the predefined minimum offer duration reveals that the determined maximum possible offer duration is longer than the predefined minimum offer duration, the functional unit is advantageously configured to determine the location-dependent time at which the request message is to be output from the determined maximum possible offer duration, i.e. in this case the time period which is determined on the basis of the deceleration strategy, but which the deceleration strategy should be implemented (for the first time) (in order ideally to be able to reach the new maximum permissible top speed at the location of the relevant event), is used as an output time for the request message.

However, if a comparison of a possible offer duration, determined on the basis of a determined deceleration strategy, up to the reaching of the relevant event with the predefined minimum offer duration reveals that the determined maximum possible offer duration is not longer than the predefined minimum offer duration, the functional unit is advantageously configured to determine the location-dependent time at which the request message is to be output from the predefined minimum offer duration (of e.g. 2-3 seconds before the reaching of the relevant location), i.e. in this case the request message is already output before the determined deceleration strategy can be or should be implemented.

If the situation then occurs in which after the outputting of the request message the driver immediately enables the automatic implementation through a corresponding operator control action, but still before the starting time which is determined on the basis of the deceleration strategy has been reached, the functional unit is only configured to cease the display of the request message immediately and to decelerate the vehicle with a low level of deceleration, even if the location at which the determined deceleration strategy is actually to be started has not yet been reached.

In order to also prevent excessively early displaying of a request message, in addition to an excessively short, e.g. very late, display request, in an analogous approach to this problem the functional unit of the longitudinal driver assistance system is configured in such a way that, during the determination of the location-dependent time, a predefined maximum offer duration or a predefined maximum distance up to the location of the relevant event is to be taken into account for the outputting of the request message.

The predefined maximum duration or maximum distance can be here a permanently predefined value of e.g. approximately 1000 m or approximately 600 m, in particular of approximately 800 m. Alternatively it also contemplated to predefine (in a variable fashion), instead of a permanently defined maximum duration or maximum distance, the maximum duration or maximum distance as a function of predefined parameters such as e.g. the class of road which is currently being travel on and/or is upcoming, the speed which is currently being travel at and/or the new maximum permissible top speed.

In one advantageous refinement of the invention, the functional unit can accordingly be configured to determine such a location-dependent time that the request message can be displayed at a maximum for a predefined maximum offer duration, or is output at the earliest when a predefined maximum distance from the location of the relevant event is reached.

In addition to the predefined maximum offer duration or maximum distance which is to be taken into account, in one advantageous development of the invention, a (maximum) possible offer duration (or a permitted activation distance which is derived therefrom) up to the reaching of the relevant event is also to be taken into account here on the basis of a determined or currently permitted deceleration strategy, in particular by a comparison of this possible offer duration, determined on the basis of the deceleration strategy, with the predefined maximum duration (or of an activation distance derived from the deceleration strategy with the predefined maximum distance).

If a comparison of a possible offer duration, determined on the basis of a determined deceleration strategy, (or of the permitted activation distance derived therefrom) up to the reaching of the relevant event with the predefined maximum duration (or the maximum distance) reveals that the determined maximum possible offer duration (or the permitted activation distance derived therefrom) occurs or is reached earlier in terms of timing than the predefined maximum duration or maximum distance, the functional unit is advantageously configured to determine the location-dependent time at which the request message is to be output from the predetermined maximum duration, or not to output the request message until the maximum distance has been reached.

However, if a comparison of a possible offer duration, determined on the basis of a determined deceleration strategy, (or of the permitted activation distance derived therefrom) up to the reaching of the relevant event with the predefined maximum duration (or the maximum distance) reveals that the determined maximum possible offer duration (or the permitted activation distance derived therefrom) does not occur earlier or is not reached earlier in terms of timing than the predefined maximum duration or maximum distance, the functional unit is advantageously configured to determine the location-dependent time at which the request message is to be output from the determined possible offer duration, i.e. in this case the time period which is determined on the basis of the deceleration strategy, but the deceleration strategy which should be implemented (for the first time) (in order ideally to be able to reach the new maximum permissible top speed at the location of the relevant event), is used as an output time for the request message.

For the sake of completeness it is to be noted here that the inventive aspect of taking into account a predefined maximum permissible maximum distance or maximum duration is to be understood independently of the above statements with respect to the taking into account of a predefined minimum offer duration as an independent concept. The applicant reserves the right in this respect to pursue this inventive concept in a separate patent application.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
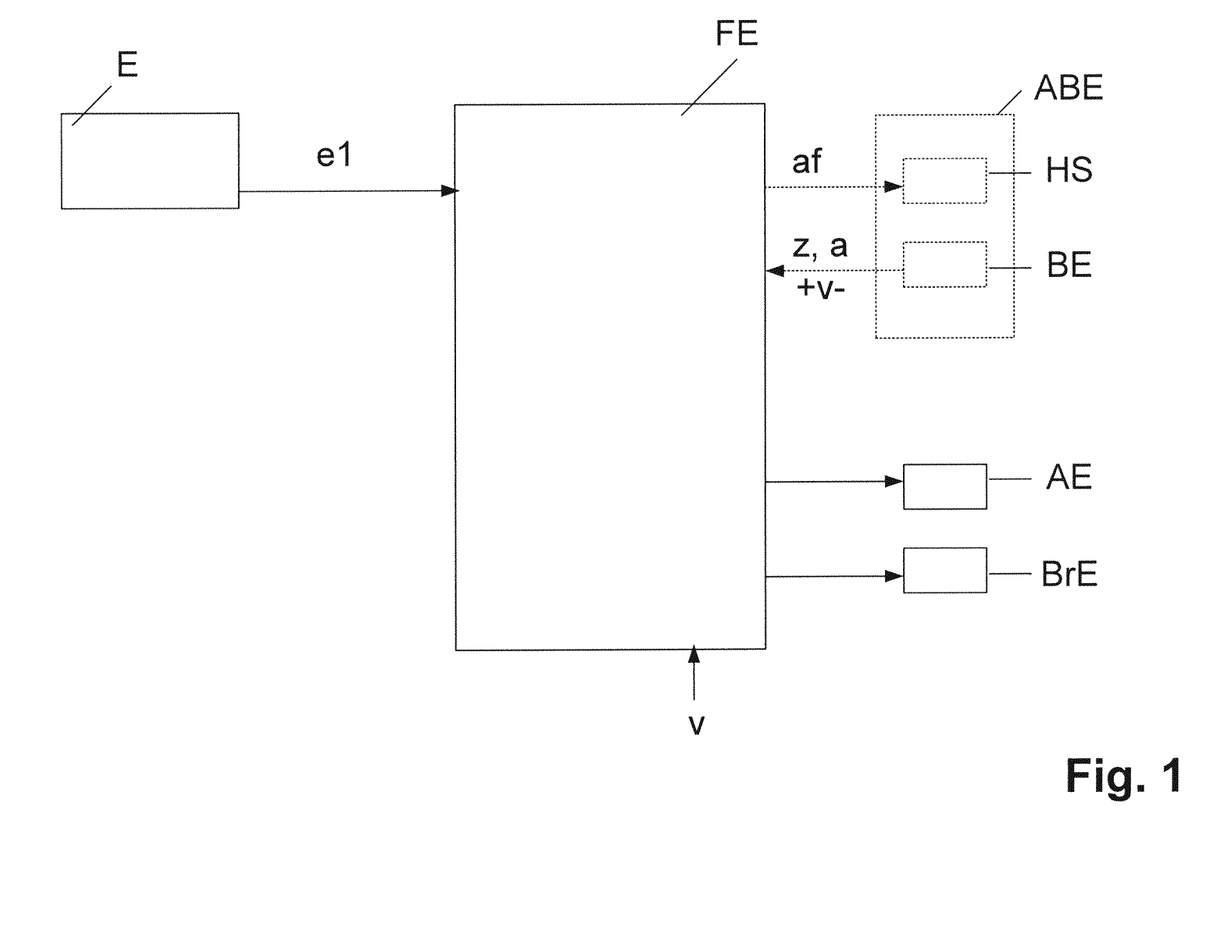
FIG. 1 is a schematic block diagram of an exemplary design of a longitudinal driver assistance system which is embodied as a cruise control system in a motor vehicle and has the purpose of adjusting the speed to a target speed.

FIG. 1 shows in detail, as a central element of a longitudinal driver assistance system, a functional unit FE which receives input signals e1 of a detection system E, a speed signal v, an approval signal z for approving automatic adaptation of the maximum permissible top speed, a rejection signal a for rejecting the approval of the automation adaptation of the maximum permissible top speed, and a signal +v– for manually adapting the maximum permissible top speed.

The detection unit E is a map-based detection unit E which detects, on the basis of map data which is present, the position of the vehicle in question and a known upcoming route section, events which require (e.g. speed limit) or permit (e.g. cancellation of a speed limit) adaptation of the maximum permissible top speed. The map-based detection unit E is configured in such a way that, on the one hand, it detects the location of the upcoming relevant event, that is to say also the level of the maximum permitted limiting speed which applies from this location, and transmits it to the functional unit FE by way of the signal e1.

Furthermore, the map-based detection unit E can detect information which is present relating to the route profile such as e.g. roundabouts, tight bends and/or junctions on the basis of the map data which is present, and if appropriate taking into account a planned route, and transmit the information to the functional unit. Relevant events which require adaptation of the maximum permissible top speed can also be derived from this information relating to the route profile.

In addition, but not illustrated here, the functional unit FE can be connected to a camera-based detection unit which also detects upcoming, speed-limiting events, which possibly require adaptation of the maximum permissible top speed to a new top speed, on the basis of the data of a sensor system (e.g. video sensor system) which is oriented forward. In contrast to the map-based detection unit E, the camera-based detection unit can only detect the relevant locations predictively on the basis of the sensor system, and only relatively in the short term or—owing to the necessary signal processing—even after the relevant event has occurred.

As soon as relevant data e1 relating to the location of an upcoming relevant event and the level of the maximum permitted limiting speed from this location is available to the functional unit FE, said functional unit FE can firstly determine the maximum permissible top speed at the location of the upcoming event, while taking into account a driver's specification. Alternatively, the transmitted maximum permitted limiting speed can also be used directly as the maximum permissible top speed.

On the basis of further relevant data which is available, the functional unit FE brings about an outputting of a request signal at a defined time by way of a corresponding signal of to a display operator control unit ABE which comprises a message system HS and an operator control element BE. The further relevant data can be e.g. the relative speed between the vehicle and the determined new maximum permissible top speed, the distance from the relevant location, the currently applicable maximum permissible top speed, information as to whether the vehicle is in a free travel mode with currently applicable maximum permissible top speed or a follow-on travel mode with a maximum permissible top speed that is lower than the currently applicable one, the relevant information which is present relating to the route profile, in particular a determined maximum recommended top speed, a determined deceleration strategy, a predefined minimum offer duration and/or a predefined maximum distance. Depending on the configuration of the cruise control system, the outputting can basically be brought about, according to a first alternative, only if the determined new maximum permissible top speed is lower than the maximum desired target speed which is predefined by the driver. According to a second alternative, the outputting can take place independently of the maximum target speed desired by the driver.

The operator control element BE, by which the driver can confirm the request message, is configured in such a way that at those times at which no request message is output, the driver can request manual adaptation of the maximum desired target speed+v−. Furthermore, the operator control element BE is configured in such a way that when the request message is output, the driver can confirm, by way of a first type of confirmation, the requested approval of the automatic adaptation of the permissible top speed (signal z), or, by way of a second type of confirmation, can reject the requested approval of the automatic adaptation of the maximum permissible top speed (signal a).

The display operator control unit ABE sends back a corresponding "approval" signal z to the functional unit FE only if the driver confirms the request signal by actuating the operator control element BE in accordance with the first type of confirmation when the request message is output. In response to this, the functional unit FE begins to initiate the automatic adaptation of the maximum permissible top speed and begins (if possible) adaptation of the cruise control, in accordance with the new top speed, taking into account the new maximum permissible top speed by bringing about corresponding actuation of the drive unit AE and/or brake unit BrE. If the vehicle is, for example, in the so-called free travel mode, the speed is adjusted in order to reach the new top speed at the location of the decisive event. If the vehicle is in the so-called follow-on mode with respect to a target object traveling ahead, the follow-on travel control is (initially) continued taking into account the new maximum permissible top speed. At the same time, when the approval confirmation z which is triggered manually is detected, the cessation of the outputting of the request message is brought about.

If the driver rejects the approval of the automatic adaptation of the maximum permissible top speed by confirming the operator control element BE according to the second type of confirmation when the request message is output, the display operator control unit sends back a signal a to the functional unit FE. In response, the functional unit discards the newly determined maximum permissible top speed and continues the current cruise control. At the same time, when the rejection which is triggered manually is detected, the cessation of the outputting of the request message is brought about.

With respect to the invention, the functional unit FE is then configured to determine, while taking into account a predefined minimum offer duration and a predefined maximum distance, the defined time at which the request message is to be output. In one specific refinement this could take place as follows.

If data e1 relating to a relevant event which requires adaptation of the maximum permissible top speed is transmitted to the functional unit FE, said functional unit FE firstly determines the new maximum permissible top speed and, on the basis of a determined, approved deceleration strategy, a preliminary location-dependent time at which a request message for the approval of the automatic adaptation of the maximum permissible top speed can be output, and a maximum possible offer duration for the request message on the basis of this preliminary location-dependent time. This maximum permissible offer duration is then compared with a predefined minimum offer duration. If the maximum possible offer duration is longer than the predefined minimum offer duration, the determined preliminary location-dependent time is defined as a location-dependent time which is applicable for bringing about the outputting of the request message. When this location-dependent time is reached, the outputting of the request message is brought about. However, if the maximum possible offer duration is not longer or is shorter than the predefined minimum offer duration, the determined preliminary location-dependent time is determined from the predefined minimum offer duration. When this location-dependent time is reached, the outputting of the request message is brought about. The result is that the request message can be displayed at least for the predefined minimum offer duration up until the relevant event has been reached.

In addition, the distance between the location-dependent time and the relevant event is determined on the basis of the determined preliminary location-dependent time and is compared with a predefined maximum permissible maximum distance from the location of the relevant event. If the location-dependent time occurs, when considered in spatial terms, before the start of the maximum permitted maximum distance, the actual applicable location-dependent time at which the request message is brought about is determined from the predefined maximum permissible maximum distance. The result is that the request message is output at the earliest with the reaching of the maximum permissible maximum distance. If the location-dependent time occurs, when considered in spatial terms, after the start of the maximum permitted maximum distance, the provisionally determined location-dependent time is used as the actual applicable location-dependent time.

Figure 2:
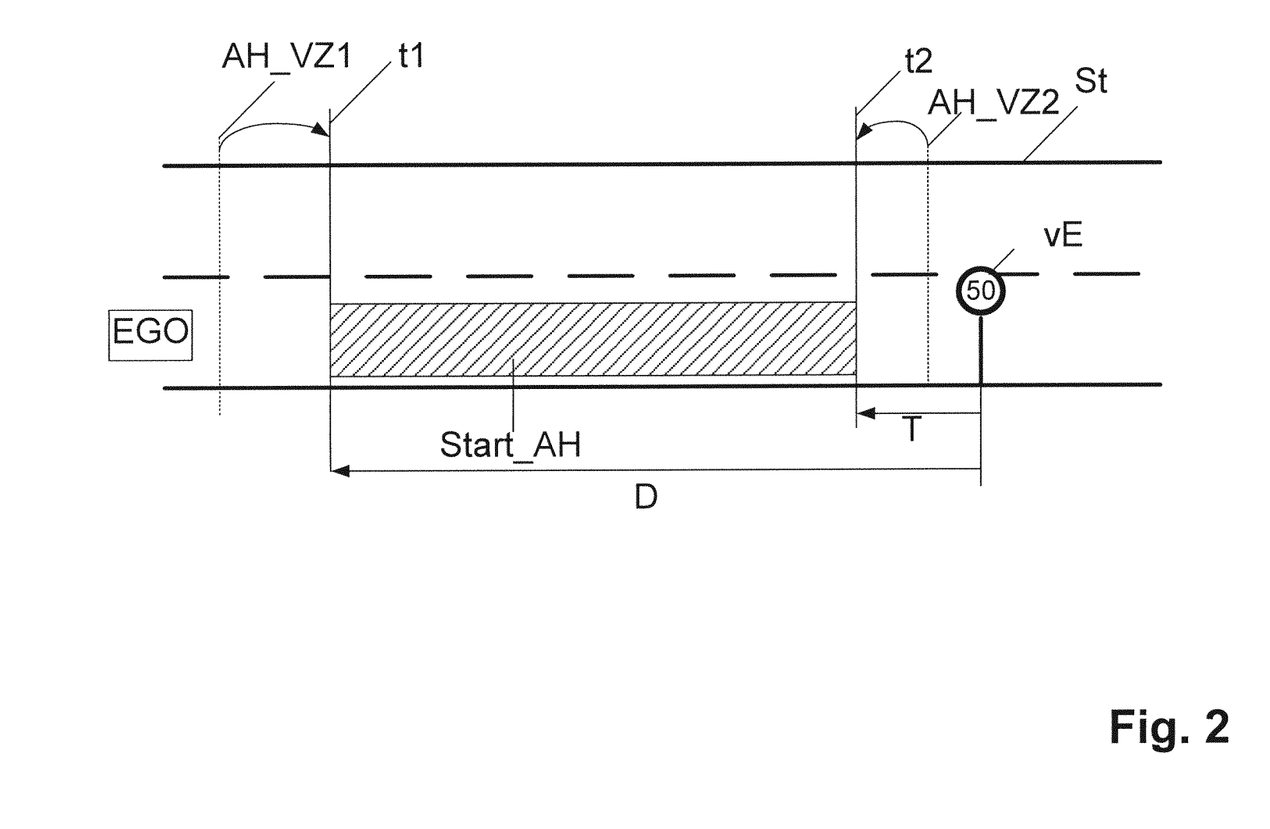
FIG. 2 is a traffic situation illustrating the area which is approved for the actuation of a request message for approving adaptation of the maximum permitted top speed.

FIG. 2 shows a traffic situation illustrating the area which is approved for the activation of a request message for approving adaptation of the maximum permitted top speed. In detail, FIG. 2 shows a road St with a speed limit sign as an upcoming event vE which requires a reduction of the maximum permissible speed of a vehicle EGO which is located on the road.

Owing to a predefined minimum offer duration T (e.g. 3 seconds up to the reaching of the relevant event vE) and a predefined maximum distance D (e.g. 800 m before the relevant event vE), an activation of a request message for the approval of automatic adaptation of the maximum permissible top speed must take place within the area Start_AH which is bounded by the maximum distance D and the minimum offer duration T. In other words, on the basis of the predefined minimum offer duration T, the activation of the request message must take place at the latest at the time t2, and on the basis of the predefined maximum distance D, the request message may be output at the earliest at the time t1. If the location-dependent time AH_VZ1 were to be determined on the basis of the currently approved deceleration strategy as an output point (output time), the outputting is prevented until the start of the approved output area Start_AH is reached. If the location-dependent time AH_VZ2 were to be determined on the basis of a currently possible or approved deceleration strategy as an output point (output time), the outputting would have to be brought about earlier, that is to say at the latest at the end of the approved output area Start_AH.

Figure 3:
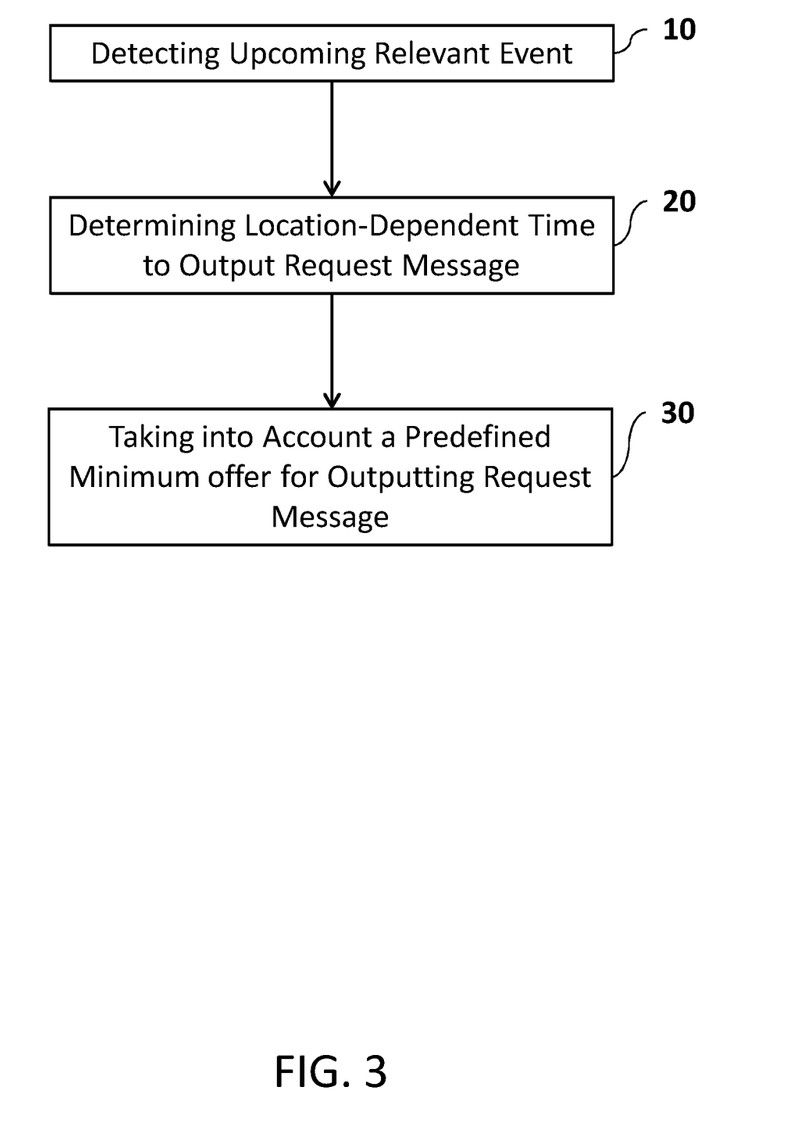
FIG. 3 is a method carried out by the longitudinal driver assistance system of FIG. 1.

With reference to FIG. 3, the longitudinal driver assistance system according to the invention for a motor vehicle comprises a detection system for detecting, at block 10, upcoming relevant events which require a change in the maximum permissible top speed, and a functional unit which, when a relevant upcoming event is detected, determines at block 20, taking into account the location of the relevant event (and, if appropriate, further necessary information such as e.g. a determined maximum permissible speed at the location of the relevant event, the differential speed between the vehicle and the determined new maximum permissible speed, detected free travel or follow-on travel, current or approved deceleration operating modes of the vehicle such as e.g. sailing mode, thrust mode, braking mode), a location-dependent time, at the reaching of which the functional unit causes, at block 30, a request message to be output to approve automatic adaptation of the current maximum permissible top speed to a new maximum permissible top speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinal driver assistance system in a motor vehicle configured to:
   detect upcoming relevant events which require a change in a maximum permissible top speed; and
   determine, in response to a relevant event being detected, a location-dependent time, taking into account the location of the relevant event, at the reaching of which the functional unit causes a request message to be output to approve automatic adaptation of a current maximum permissible top speed to a new maximum permissible top speed; and
   take into account, during the determination of the location-dependent time, a predefined minimum offer duration for the outputting of request message.

2. The longitudinal driver assistance system as claimed in claim 1, wherein
   the minimum offer duration is a minimum offer duration up to the reaching of the relevant event.

3. The longitudinal driver assistance system as claimed in claim 1, wherein
   longitudinal driver assistance system is configured to determine a location-dependent time such that the request message is displayable at least for the predefined minimum offer duration.

4. The longitudinal driver assistance system as claimed in claim 1, wherein
   longitudinal driver assistance system is configured to determine, based on a determined deceleration strategy, a possible offer duration up to the reaching of the relevant event, and to take into account said determined possible offer duration during the determination of the location-dependent time.

5. The longitudinal driver assistance system as claimed in claim 4, wherein
   the deceleration strategy is determined such that the determined maximum permissible top speed is reachable at the location of the relevant event when the deceleration strategy is implemented.

6. The longitudinal driver assistance system as claimed in claim 1, wherein
   longitudinal driver assistance system is configured to determine the location-dependent time based on the determined deceleration strategy when there is a possible offer duration which is determined based on a determined deceleration strategy and which is longer than the predefined minimum offer duration.

7. The longitudinal driver assistance system as claimed in claim 1, wherein
   longitudinal driver assistance system is configured to determine the location-dependent time from the predefined minimum offer duration when there is a possible offer duration which is determined on the basis of a determined deceleration strategy and which is not longer than the predefined minimum offer duration.

8. The longitudinal driver assistance system as claimed in claim 1, wherein
   longitudinal driver assistance system is configured to take into account, during the determination of the location-dependent time, a predefined maximum offer duration or a predefined maximum distance up to the location of the relevant event for the outputting of the request message.

9. The longitudinal driver assistance system as claimed in claim 8, wherein
   longitudinal driver assistance system is configured to determine such a location-dependent time that the request message can be displayed for a predefined maximum offer duration, or is output at the earliest when a predefined maximum distance from the location of the relevant event is reached.

10. The method as claimed in claim 1, wherein
    during the determining of the location-dependent time, a predefined maximum offer duration or a predefined maximum distance up to the location of the relevant event is factored into account for the outputting of the request message.

11. The method as claimed in claim 10, wherein
the location-dependent time is determined such that the request message is displayable for a predefined maximum offer duration, or is output at the earliest when a predefined maximum distance from the location of the relevant event is reached.

12. A method of operating a longitudinal driver assistance system in a motor vehicle, the method comprising the acts of:
   detecting upcoming relevant events which require a change in a maximum permissible top speed of the vehicle;
   determining, in response to a relevant event being detected, a location-dependent time taking into account a location of the relevant event at the reaching of which causes a request message to be output, the request message requesting approval of an automatic adaptation of a current maximum permissible top speed to a new maximum permissible top speed, wherein
   during the determining of the location-dependent time, a predefined minimum offer duration for the outputting of the request message is taken into account.

13. The method as claimed in claim 12, wherein
the minimum offer duration is a minimum offer duration up to the reaching of the relevant event.

14. The method as claimed in claim 12, wherein
the location-dependent time is determined such that the request message is displayable at least for the predefined minimum offer duration.

15. The method as claimed in claim 12, further comprising the acts of:
   determining a possible offer duration up to the reaching of the relevant event based on a determined deceleration strategy; and
   factoring into account the determined possible offer duration during the act of determining the location-dependent time.

16. The method as claimed in claim 15, wherein
the deceleration strategy is determined such that the new maximum permissible top speed is reachable at the location of the relevant event when the deceleration strategy is implemented.

17. The method as claimed in claim 12, wherein
the act of determining the location-dependent time is based on a determined deceleration strategy when there is a possible offer duration which is determined based on a determined deceleration strategy and which is longer than the predefined minimum offer duration.

18. The method as claimed in claim 12, wherein
the act of determining the location-dependent time is carried out based on the predefined minimum offer duration when there is a possible offer duration which is determined based on a determined deceleration strategy and which is not longer than the predefined minimum offer duration.

* * * * *

UNITED STATES PATENT AND TRADEMARK OFFICE
CERTIFICATE OF CORRECTION

PATENT NO. : 10,576,979 B2
APPLICATION NO. : 15/869574
DATED : March 3, 2020
INVENTOR(S) : Stefan Knoller It is certified that error appears in the above-identified patent and that said Letters Patent is hereby corrected as shown below:

On the Title Page

Please correct the Applicant information as follows:
(30) Foreign Application Priority Data: 10 2015 213 183

Signed and Sealed this
Twenty-sixth Day of May, 2020

Andrei Iancu
*Director of the United States Patent and Trademark Office*